United States Patent Office 2,721,885
Patented Oct. 25, 1955

2,721,885

CONDENSATION OF AROMATIC COMPOUNDS WITH UNSATURATED ORGANIC COMPOUNDS IN THE PRESENCE OF COMPOSITE CATALYSTS

Herman Pines, Evanston, Ill., and Vladimir N. Ipatieff, deceased, late of Chicago, Ill., by Vladimir Haensel, Hinsdale, Herman Pines, Evanston, and Vincetta Kibort, Chicago, Ill., executors, assignors to Universal Oil Products Company, Des Plaines, Ill., a corporation of Delaware No Drawing. Application June 7, 1954,
Serial No. 435,031

14 Claims. (Cl. 260—668)

This application is a continuation-in-part of our copending application Serial No. 219,314, filed April 4, 1951, now abandoned.

This invention relates to the condensation of unsaturated organic compounds with aromatic compounds and to products formed thereby. This invention relates more particularly to the side chain alkylation with an olefin of an alkylaromatic hydrocarbon in which a carbon atom combined with the aromatic nucleus is also combined with at least one hydrogen atom. The process relates more specifically to the side chain alkylation with ethylene of an alkylbenzene hydrocarbon having at least one hydrogen atom combined with a carbon atom in alpha position to the benzene ring.

The condensation of aromatic compounds with unsaturated organic compounds such as the alkylation of aromatic hydrocarbons with olefinic hydrocarbons, has been the subject of many investigations over a long period of time. Many different catalysts have been used including various mineral acids and acid-acting compounds but in all of these reactions, nuclear condensation has always been effected. Thus in the acid catalyzed alkylation of aromatic compounds having attached to a carbon atom of the ring a saturated carbon atom to which is attached at least one hydrogen atom, the entering alkyl group attaches to the aromatic nucleus. No direct catalytic method of introducing the alkyl group into the side chain has been known. Heretofore we accomplished side chain alkylation of toluene and related alkylaromatic compounds by noncatalyzed thermal means as set forth in our copending application Serial Number 152,991 filed March 30, 1950, now abandoned, but this thermal alkylation process requires high temperatures and high pressures for its successful operation.

We have now found that side chain alkylation of toluene and other carbocyclic aromatic and heterocyclic aromatic ring compounds having a nonolefinic double bond such as pyridine, quinoline, pyrrole, etc. and having attached to a nuclear carbon atom a saturated carbon atom to which is attached at least one hydrogen atom may also be used as starting materials to effect side chain alkylation with an olefin at relatively lower temperatures and pressures in the presence of a catalyst comprising essentially an alkali metal and an organic compound represented by the formula RX wherein R is a member of the group consisting of alkyl, alkenyl, cycloalkyl, aralkyl and aryl radicals and X is selected from the group consisting of a hydroxyl group, a carboxylic acid group, an alkoxyl group, a nitro group and a cyano group. The carbon atom which is attached to the aromatic nucleus of said aromatic compounds is referred to as a "saturated" carbon atom because it is a part of a nonolefinic group such as an alkyl group, a cycloalkyl group, and an aralkyl group containing no ethylenic bonds or similar unsaturation. The carbon atom which is attached to an aromatic nucleus is thus a part of a saturated group including an alkyl group and a cycloalkyl group, and an aralkyl group containing no olefinic unsaturation.

An object of this invention is to react an unsaturated organic compound with an aromatic compound selected from the group consisting of carbocyclic and heterocyclic aromatic ring compounds having attached to a nuclear carbon atom a nonolefinic or saturated carbon atom to which is attached at least one hydrogen atom.

An additional object of this invention is to react a monoolefin with an alkylaromatic hydrocarbon to form an aromatic hydrocarbon with a longer alkyl group.

Another object of this invention is to condense ethylene with the side chain of an alkylaromatic hydrocarbon having attached to a nuclear carbon atom a carbon atom of said alkyl group to which is attached at least one hydrogen atom.

Still another object of this invention is to condense ethylene with the alkyl side chain of an alkylbenzene hydrocarbon, said side chain containing an alpha carbon atom to which is attached a replaceable hydrogen atom.

A further object of this invention is to condense ethylene with the cycloalkyl group of a cycloalkylbenzene hydrocarbon, said cycloalkyl group having a hydrogen atom combined with the carbon atom of the cycloalkyl group which is attached to the aromatic ring.

A still further object of this invention is to provide a process for the side chain alkylation of an alkylaromatic hydrocarbon.

A further object of this invention is to condense ethylene with a polycyclic hydrocarbon having at least one of the rings saturated and having at least one hydrogen atom combined with the carbon atom of the saturated ring which is attached to the aromatic ring.

An additional object of this invention is to provide a method for producing an aromatic compound containing a long hydrocarbon side chain, said compound being useful in the production of detergents, wetting agents and the like.

One embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group and an aralkyl group and to which last named carbon atom is attached at least one hydrogen atom, the process being carried out at condensation conditions in the presence of an alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering the resultant condensation product.

A second embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last named carbon atom is attached at least one hydrogen atom at condensation conditions in the presence of an alkali metal and of an organic compound represented by the formula RX wherein R is a member of the group consisting of alkyl, cycloalkyl, aralkyl, and aryl radicals and X is selected from the group consisting of a hydroxyl group, a carboxylic acid group, an alkoxyl group, a nitro group, and a cyano group.

Another embodiment of this invention relates to a process which comprises reacting a monoolefin and an aromatic compound having attached to a nuclear carbon atom a carbon atom of a saturated hydrocarbon group and to which last named carbon atom is attached at least one hydrogen atom at condensation conditions in the presence of an alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

Still another embodiment of this invention relates to a process for producing longer chain aromatic hydrocarbons which comprises reacting an alkene and an aromatic hydrocarbon having attached to a nuclear carbon atom a carbon atom of a saturated hydrocarbon group and to which last named carbon atom is attached at least one hydrogen atom at a condensation temperature in the presence of an alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

A further embodiment of this invention relates to a process for producing a longer chain benzene hydrocarbon which comprises reacting an alkene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially sodium and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

A still further embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially an alkali metal and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering a longer chain benzene hydrocarbon from the resultant reaction product.

An additional embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially sodium and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering the resultant reaction products.

A still additional embodiment of this invention relates to a process which comprises catalytically reacting a non-conjugated olefinic hydrocarbon and an aromatic compound having a structure represented by the formula:

wherein Ar represents an aromatic radical having a nucleus selected from carbocyclic and heterocyclic nuclei and R and R' each separately and independently represents a member of the group consisting of a hydrogen atom, an alkyl group, a cycloalkyl group, and an aryl group and R and R' together represent a cycloalkyl group, the process being carried out at a condensation temperature in the presence of a catalyst comprising essentially an alkali metal and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering the resultant condensation product.

Still another embodiment of this invention relates to a process for producing normal propylbenzene which comprises reacting ethylene and toluene at a condensation temperature in the presence of a catalyst comprising essentially sodium and an organic hydroxy compound, and recovering the resultant condensation product.

Another embodiment of this invention relates to a process for producing normal propylbenzene which comprises reacting ethylene and toluene at a condensation temperature in the presence of a catalyst comprising essentially sodium and an organic nitro compound, and recovering normal propylbenzene from the resultant reaction product.

An additional embodiment of this invention relates to a process for producing normal propylbenzene which comprises reacting ethylene and toluene at a condensation temperature in the presence of a catalyst comprising essentially sodium and an organic acid, and recovering normal propylbenzene from the resultant reaction product.

A still further embodiment of this invention relates to a process for producing normal propylbenzene which comprises reacting ethylene and toluene at a condensation temperature in the presence of a catalyst comprising essentially sodium and a branched chain alcohol, and recovering normal propylbenzene from the resultant reaction product.

The compounds with which unsaturated organic compounds are condensed in our process comprise aromatic compounds having attached to a nuclear carbon atom a carbon atom of a saturated hydrocarbon group to which last named carbon atom is attached at least one hydrogen atom. By the term aromatic compound we mean to include not only benzene, substituted benzenes, naphthalenes, and derivatives thereof, but also all compounds containing a stable ring or nucleus such as is present in benzene and which possesses unsaturation in the sense that benzene does, but which has no ethylenic unsaturation. Consequently it can be seen that the term aromatic compound, in the sense in which it is used in the specification and the appended claims, includes not only carbocyclic compounds but also heterocyclic compounds having stable nuclei. The carbocyclic compounds may have a benzene, naphthalene, etc. nucleus. The heterocyclic aromatic compounds may have a pyridine, furan, thiophene, pyrrole, pyrazole, etc., nucleus. In addition, the aromatic compounds contemplated for use in our process may contain both a carbocyclic ring and a heterocyclic ring such as is found in indole and in carbazole. Also, the aromatic compounds may contain both a benzene nucleus and a cycloalkane nucleus such as is found in tetralin and in indan.

As hereinbefore stated, the aromatic compounds preferred for use in our process contain a saturated side chain, said chain being attached to a nuclear carbon atom by a saturated carbon atom, i. e., a carbon atom that is bonded by univalent bonds to four atoms. The saturated carbon atom should have at least one hydrogen atom attached thereto. These requisites are desirable for the reason that aromatic compounds such as t-butylbenzene, which do not have a hydrogen atom attached to the alpha carbon atom, show very little tendency under the conditions of operation employed in our process to undergo condensation of the type herein taught. Similarly, styrene, in which the alpha carbon atom in the side chain is unsaturated, does not condense with unsaturated organic compounds in the manner herein specified. Thus the preferred aromatic compounds are those in which the alpha carbon atom of the side chain is saturated and in which said alpha carbon atom has at least one hydrogen atom attached thereto. The side chain may comprise only one carbon atom, as the methyl group in toluene, or it may comprise a number of saturated carbon atoms in straight chain or branched chain relation such as the normal butyl radical or the isobutyl radical in normal butylbenzene and isobutylbenzene, respectively. The substituent need not necessarily be an aliphatic chain; it may be a cycloalkane radical as in tetralin or as in cyclohexylbenzene and an aralkyl side chain as a benzyl group in diphenylmethane.

Suitable alkylaromatic hydrocarbons include toluene, ethylbenzene, normal propylbenzene, cumene, normal and secondary butylbenzene, methylnaphthalene, and the like. Other suitable aromatic hydrocarbons include tetralin, indan, diphenylmethane, cyclopentylbenzene, and methylethylbenzene.

The aromatic reactants employed in our process are condensed with nonconjugated unsaturated organic compounds. The unsaturated organic compounds are olefinic in character and include monoolefins and particularly ethylene. For the purposes of this invention, aromatic compounds such as benzene are not regarded as being unsaturated. Examples of unsaturated organic compounds suitable for use in this process include monoolefins such as ethylene, propylene, 1-butene, 2-butene, and isobutylene; monoolefins of higher molecular weight; nonconjugated dienes, such as 2,5-dimethyl-1,5-hexadiene, and nonconjugated polyolefins containing more than two pairs of double bonds per molecule; unsaturated ketones such as mesityl oxide, and compounds such as allyl amine, allyl cyanide, acrylonitrile, alpha-cyanoacrylonitrile and the like.

Catalysts which are useful in this process include a combination of an alkali metal or alkali metals and at least one organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group and a cyano group. Of the alkali metals: lithium, sodium, potassium, rubidium, and cesium, the more plentiful sodium and potassium are generally preferred and particularly sodium because of its relatively lower cost. These alkali metals are utilized together with the organic compounds represented by the formula RX as indicated hereinabove. The RX compounds thus include alcohols, particularly branched chain alkanols and also hydroxy aryl compounds such as phenols and various alkyl phenols including phenol, cresols, xylenols, etc. Carboxylic acids which are utilized with alkali metals as catalyst for this process include particularly aromatic monocarboxylic acids such as benzoic acid, toluic acid, etc. Nitrobenzene and other nitroaromatic hydrocarbons and nitroalkanes are also combined with alkali metals to form effective catalysts for the process. The cyano compounds include $C_6H_5CN$. In general an excess of the alkali metal is employed relatively to the RX compound also present in the catalyst mixture.

Better contacting of the reactants and catalysts and improved yields of desired products are sometimes effected by mixing the alkali metal and organic compound RX catalyst mixture with a catalyst supporting or spacing material such as activated charcoal; also granular coke, silica, alumina, pumice, porcelain, quartz, etc.; steel turnings, copper shot, etc. which do not have an adverse influence on the reaction but improve the mixing. Such spacing materials are useful in either batch type operation as in an autoclave or in continuous treatment in a tubular reactor or other suitable apparatus.

The process of this invention is carried out using either batch or continuous types of operation in suitable equipment such as autoclaves or tubular reactors constructed from steel or glass lined steel reactors. The process is carried out at a temperature of from about 100° to about 350° C. and preferably at a temperature of from about 150° to about 275° C. at a pressure of from about 5 to about 50 atmospheres. When the stirring or mixing of the reactants and catalyst is very thorough and efficient, the process may be carried out readily at a temperature of 125° C. and at a pressure of 5 atmospheres, but higher temperatures and pressures are preferred when the mixing is less efficient. The operating temperatures and pressure will also be dependent upon the aromatic and olefinc hydrocarbons charged and upon the ratios of reactants present in the reaction zone, as well as upon the catalyst present.

In order to promote the primary side chain alkylation that is to attach only one alkyl group to the alkyl side chain and in some instances to decrease the loss of olefin through undesired side reactions, it is generally preferred to employ an excess of aromatic hydrocarbon to olefin such as ethylene in this process. In other words, the preferred ratio of aromatic hydrocarbon to olefinic hydrocarbon is greater than one.

The amount of catalyst used in the process is dependent upon the nature and reactivity of the aromatic hydrocarbon undergoing side chain alkylation and upon the nature of the olefin used as alkylating agent. Also the particular organic compound RX or catalyst promoter also has an influence upon the amount of alkali metal necessary for efficient operation of the process.

In general from about 0.05 to about 0.5 atomic proportions of alkali metal is present per molar proportion of alkylaromatic hydrocarbon or other side chain alkylatable hydrocarbon present in the reaction zone. Also from about 0.01 to about 0.4 molar proportion of an RX compound or a mixture of RX compounds disclosed hereinabove will be employed together with the alkali metal. In the resultant catalyst mixture, the alkali metal is present in an amount such that more than one atomic proportion of alkali metal is present per molar proportion of RX compound also utilized in the catalyst.

The ratios within the above defined limits of the alkali metal used and the RX compound are not critical; they will depend upon experimental condition and the compounds undergoing side chain alkylation.

In carrying out the process the olenic hydrocarbon charged such as ethylene may be introduced continuously or intermittently, the latter method being commonly employed in the usual type of batch operation conducted in an autoclave so that the consumption of ethylene can be followed by observing the decrease in operating pressure of the autoclave as the reaction progresses. After the reaction has reached the desired stage of completion, the reaction products are discharged from the autoclave, unconverted olefins such as ethylene is recovered for further use in the process or utilized for some other purpose. The mixture of reaction products is then subjected to suitable separation treatment such as filtration to remove unconsumed alkali metal catalyst followed by fractional distillation of normally liquid products to separate unconverted charging stock from side chain alkylated products and higher boiling materials, the latter being sometimes formed as by-products of the reaction.

In this process one molecular proportion of olefin such as ethylene and one molecular proportion of alkylaromatic hydrocarbon as toluene react in the presence of a catalyst such as described above to form a longer chain alkylaromatic hydrocarbon as illustrated by the following equation:

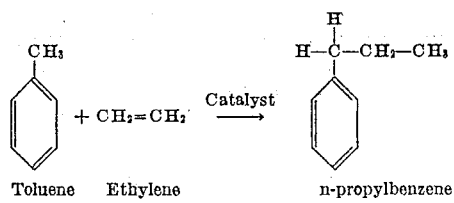

Toluene   Ethylene                    n-propylbenzene

The resultant reaction product such as n-propylbenzene may sometimes react with a further molecular proportion of olefin as ethylene to form a still longer chain alkylaromatic hydrocarbon as indicated in the following equation:

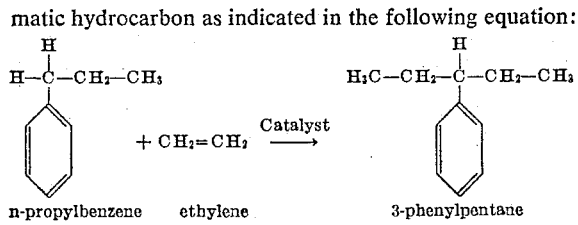

n-propylbenzene   ethylene        3-phenylpentane

Other alkylaromatic hydrocarbons and cycloalkylaromatic hydrocarbons may be reacted similarly with ethylene to produce longer chain alkylaromatic hydrocarbons from one molecular proportion of the charged alkylaromatic hydrocarbon and one, two or more molecular proportions of the olefin.

The nature of this invention is illustrated further by the following examples which however should not be misconstrued to limit unduly the generally broad scope of the invention.

EXAMPLE I

A glass-lined rotatable steel autoclave of 850 cc. capacity was charged with 92 grams of toluene and 10 grams of sodium. The autoclave was then closed and ethylene was introduced to the autoclave to an initial pressure of 30 atmospheres. The autoclave containing the toluene, sodium, and ethylene was then rotated and heated for three hours at a temperature of 200–325° C. after which the autoclave was permitted to cool to room temperature. The residual ethylene was then discharged from the autoclave. The mixture of liquid products and used sodium was filtered to remove the sodium therefrom and the filtrate was subjected to fractional distillation. The distillation separated the liquid products into fractions with the properties shown in Table I:

Table I

FRACTIONAL DISTILLATION OF REACTION PRODUCTS FROM ETHYLATION OF TOLUENE WITH SODIUM ALONE

| Fraction No. | Boiling Point, °C. | Grams | Composition |
|---|---|---|---|
| 1 | 109–113 | 83.3 | Toluene. |
| 2 | 113–156 | 1.2 | 0.3 grams Toluene. |
| 3 | 156+ | 0.7 | Bottoms. |

As can be seen from the table side chain ethylation if it occurred at all, yielded 1.6 grams of product. Neither normal propylbenzene nor 3-phenylpentane were observed in the product.

EXAMPLE II

The autoclave employed in Example I and provided with a glass liner was charged with 92 grams of toluene, 6–10 grams of sodium, and 2 grams of an alcohol, after which the autoclave was charged to an initial pressure of 30 atmospheres. The charged autoclave was then heated at a temperature of from 200° to 225° C. for a time of from 4 to about 5 hours. The alcohols employed in the catalyst composites and the results obtained in the different runs are shown in Table II:

Table II

EFFECT OF ALCOHOLS UPON THE SIDE CHAIN ETHYLATION OF TOLUENE IN THE PRESENCE OF SODIUM

| Run No. | Initial | | Sodium, Gms. | Duration, Hrs. | Tol. Reacted, Mol. Percent | Yield, Mol Percent [1] | |
|---|---|---|---|---|---|---|---|
| | Kind | Grams | | | | n-propyl benzene | 3-phenyl pentane |
| 1 | sec-butyl alcohol | 2.0 | 7.4 | 5.0 | 13 | 66 | |
| 2 | iso-butyl alcohol | 2.0 | 7.2 | 4.2 | 19 | 47 | 5 |
| 3 | tert-butyl alcohol | 2.0 | 6.7 | 4.5 | 22 | 46 | 3 |
| 4 | cyclo-hexanol | 2.0 | 7.3 | 5.0 | 13 | 46 | |
| 5 | allyl alcohol | 2.0 | 7.3 | 4.5 | 10 | 26 | |
| 6 | benzyl alcohol | 2.0 | 7.3 | 3.5 | 13 | 59 | |
| 7 | tri-phenyl carbinol | 3.0 | 7.0 | 5 | 8 | 33 | |

[1] The yield was calculated on toluene reacted.

As an example, the distillation of the reaction product of Run No. 3 is presented in the following Table III:

Table III

FRACTIONAL DISTILLATION OF REACTION PRODUCTS FROM RUN 3

| Fraction No. | Boiling Point, °C. | Grams | $n_D^{20}$ | Composition |
|---|---|---|---|---|
| 1 | 104–108 | 6.2 | 1.4948 | Toluene. |
| 2 | 108–110 | 63.1 | 1.4962 | Do. |
| 3 | 110–154 | 4.2 | 1.4928 | Mixture of toluene and n-propylbenzene. |
| 4 | 154–156 | 9.0 | 1.4924 | n-Propylbenzene. |
| 5 | 156–179 | 3.7 | 1,4913 | Mixture of n-propylbenzene and 3-phenylpentane. |
| 6 | 179+ | 0.7 | 1.5025 | Bottoms. |

From the above experiments, it seems that the degree of side chain ethylation depends upon the type of alcohol used. Tert-butyl alcohol promoted the highest conversion of toluene to n-propylbenzene per pass.

EXAMPLE III

Essentially the same procedure was employed as in the preceding examples. The glass-lined autoclave of 850 cc. capacity was charged with 92 grams of toluene, 6.9 grams of sodium, 2 grams of nitrobenzene, and enough ethylene to give an initial pressure of 30 atmospheres at a temperature of 20° C. The charged autoclave was then rotated and heated at a temperature of 200–226° C. for a time of 5¼ hours. On working up the product, it was found that 14.6 grams of toluene reacted, forming 12.1 grams of n-propylbenzene. The yield of n-propylbenzene based on toluene reacted was 63 mol per cent.

EXAMPLE IV

In another run, 92 grams of toluene, 7.7 grams of sodium, 2.7 grams of isoamylnitrate, and ethylene (initial pressure 30 atmospheres) were reacted in a rotating steel autoclave at a temperature of 200–228° C. for a time of 5 hours. About 7.2 grams of toluene reacted, forming 2.9 grams of n-propylbenzene, a yield of 25% based upon toluene which reacted.

EXAMPLE V

Essentially the same procedure as used in the preceding runs was employed in the following runs referred to in Table IV. In the runs in Table IV, 92 grams of toluene was reacted with ethylene (30 atmospheres at room temperature) in the presence of about 7.5 grams (0.34 mol) of sodium and 0.02 mol of m-cresol, o-toluic acid, m-methoxy toluene, and isovaleric acid, respectively:

*Table IV*

SIDE CHAIN ALKYLATION OF TOLUENE IN THE PRESENCE OF SODIUM AND MISCELLANEOUS PROMOTERS

| Run No | 1 | 2 | 3 | 4 |
|---|---|---|---|---|
| Promoter: | | | | |
| Kind | m-cresol | o-toluic acid | m-methoxy toluene. | iso-valeric acid. |
| Grams | 2.0 | 2.7 | 2.5 | 2.0. |
| Sodium, Gms | 7.6 | 7.4 | 7.5 | 7.1. |
| Temp., °C | 200–227 | 200–225 | 200–226 | 200–226. |
| Duration, Hrs | 4.5 | 5.0 | 5.25 | 5.25. |
| Toluene Reacted, Mol Percent | 23 | 53 | <9 | <11. |
| Yield, Mol Percent[1]: | | | | |
| n-Propylbenzene | 61 | 60 | 33 | 27. |
| 3-Phenylpentane | 8.4 | 21 | | |

[1] The yields were based on toluene reacted.

Of the promoters referred to in Table IV, o-toluic acid was the most active. In run 2, 53% of the toluene reacted and yielded 60 mol per cent of n-propylbenzene and 21 mol per cent of 3-phenylpentane.

EXAMPLE VI

In another run, using the same procedure as used in the preceding examples, 92 grams of toluene, 7.3 grams of sodium, 2.0 grams of benzonitrile, and ethylene (initial pressure 30 atmospheres) were reacted in a rotating steel autoclave at a temperature of 200–206° C. for a time of 4.5 hours. About 42 mol per cent (38.4 grams) of the toluene reacted yielding 67% normal propylbenzene based on toluene reacted, and 14% 3-phenylpentane based on toluene reacted.

We claim as our invention:

1. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group and an aralkyl group and to which last-named carbon atom is attached at least one hydrogen atom, the improvement which comprises carrying out the reaction at a temperature from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering the resultant condensation product.

2. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group and a cyano group.

3. A process which comprises reacting a monoolefin and an aromatic compound having attached to a nuclear carbon atom a carbon atom of a saturated hydrocarbon group and to which last named carbon atom is attached at least one hydrogen atom at a temperature from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

4. A process for producing longer chain aromatic hydrocarbons which comprises reacting an alkene and an aromatic hydrocarbon having attached to a nuclear carbon atom a carbon atom of a saturated hydrocarbon group and to which last named carbon atom is attached at least one hydrogen atom at a condensation temperature of from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

5. A process for producing a longer chain benzene hydrocarbon which comprises reacting an alkene and a benzene hydrocarbon having attached to a nuclear carbon atom a carbon atom of a saturated hydrocarbon group and to which last named carbon atom is attached at least one hydrogen atom at a condensation temperature of from about 100° to about 350° C. and at a pressure of from about 5 to about 50 atmospheres in the presence of a catalyst comprising essentially free sodium and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group and a cyano group.

6. A process for producing a longer chain benzene hydrocarbon which comprises reacting ethylene and a benzene hydrocarbon having attached to a nuclear carbon atom a carbon atom of a saturated hydrocarbon ground and to which last named carbon atom is attached at least one hydrogen atom at a condensation temperature of from about 100° to about 350° C. and at a pressure of from about 5 to about 50 atmospheres in the presence of a catalyst comprising essentially free alkali metal and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering a longer chain benzene hydrocarbon from the resultant reaction product.

7. A process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature of from about 100° to about 350° C. and at a pressure of from about 5 to about 50 atmospheres in the presence of a catalyst comprising essentially free sodium and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering a longer chain benzene hydrocarbon from the resultant reaction products.

8. A process for producing normal propylbenzene which comprises reacting ethylene and toluene at a condensation temperature of from about 100° to about 350° C. and at a pressure of from about 5 to about 50 atmosphere in the presence of a catalyst comprising essentially free sodium and a branched chain alcohol, and recovering normal propylbenzene from the resultant reaction product.

9. A process for producing a longer chain benzene hydrocarbon which comprises reacting ethylene and toluene at a temperature of from about 100° to about 350° C. and at a pressure of from about 5 to about 50 atmospheres in the presence of a catalyst comprising essentially free alkali metal and an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering a longer chain benzene hydrocarbon from the resultant reaction product.

10. A process for producing normal propylbenzene which comprises reacting ethylene and toluene at a temperature of from about 100° to about 350° C. and at a pressure of from about 5 to about 50 atmospheres in the presence of a catalyst comprising essentially free sodium and a phenol, and recovering normal propylbenzene from the resultant reaction product.

11. In a process which comprises reacting ethylene and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group and an aralkyl group and to which last named carbon is attached at least one hydrogen atom, the improvement which comprises carrying out the reaction at a temperature from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group, and recovering the resultant condensation product.

12. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last named carbon atom is attached at least one hydrogen atom, the improvement which comprises carrying out the reaction at a temperature of from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group and a cyano group.

13. A process which comprises reacting ethylene and an aromatic compound having attached to a nuclear carbon atom a carbon atom of a saturated hydrocarbon group and to which last named carbon atom is attached at least one hydrogen atom at a temperature from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

14. A process for producing a longer chain aromatic hydrocarbon which comprises reacting ethylene and an aromatic hydrocarbon having attached to a nuclear carbon atom a carbon atom of a saturated hydrocarbon group and to which last named carbon atom is attached at least one hydrogen atom at a condensation temperature of from about 100° to about 350° C. and at a pressure of from about 5 to about 50 atmospheres in the presence of free alkali metal and of an organic compound represented by the formula RX wherein R is a member of the group consisting of alkyl, alkenyl, cycloalkyl, aralkyl, and aryl radicals and X is selected from the group consisting of a hydroxyl group, a carboxylic acid group, an alkoxyl group, a nitro group, and a cyano group.

References Cited in the file of this patent

UNITED STATES PATENTS

| 2,448,641 | Whitman | Sept. 7, 1948 |
| 2,548,803 | Little, Jr. | Apr. 10, 1951 |
| 2,670,390 | Pines et al. | Feb. 23, 1954 |
| 2,688,044 | Pines et al. | Aug. 31, 1954 |